(12) United States Patent
Zhou et al.

(10) Patent No.: US 7,842,635 B2
(45) Date of Patent: Nov. 30, 2010

(54) HYDROCARBON-SOLUBLE, BIMETALLIC CATALYST PRECURSORS AND METHODS FOR MAKING SAME

(75) Inventors: Bing Zhou, Cranbury, NJ (US); Zhenhua Zhou, Lawrenceville, NJ (US); Zhihua Wu, Lawrenceville, NJ (US)

(73) Assignee: Headwaters Technology Innovation, LLC, Lawrenceville, NJ (US)

( * ) Notice: Subject to any disclaimer, the term of this patent is extended or adjusted under 35 U.S.C. 154(b) by 956 days.

(21) Appl. No.: 11/461,652

(22) Filed: Aug. 1, 2006

(65) Prior Publication Data

US 2007/0158236 A1 Jul. 12, 2007

Related U.S. Application Data

(63) Continuation of application No. 11/327,249, filed on Jan. 6, 2006, now abandoned.

(51) Int. Cl.
*B01J 31/00* (2006.01)
*B01J 37/00* (2006.01)
*C08F 4/02* (2006.01)
*C08F 4/60* (2006.01)

(52) U.S. Cl. .................. 502/150; 502/102; 502/104; 502/154

(58) Field of Classification Search .............. 502/150, 502/102, 104, 154
See application file for complete search history.

(56) References Cited

U.S. PATENT DOCUMENTS

| | | | |
|---|---|---|---|
| 3,362,972 A | 1/1968 | Kollar | 554/71 |
| 3,578,690 A * | 5/1971 | Becker | 554/71 |
| 3,595,891 A | 7/1971 | Cavitt | 164/335 |
| 3,953,362 A | 4/1976 | Lines et al. | 502/160 |
| 3,983,028 A | 9/1976 | McCollum et al. | |
| 4,022,681 A | 5/1977 | Sheng et al. | |
| 4,066,561 A | 1/1978 | Nnadi | |
| 4,125,455 A | 11/1978 | Herbstman | 208/108 |
| 4,134,825 A | 1/1979 | Bearden, Jr. et al. | |
| 4,151,070 A | 4/1979 | Allan et al. | 208/59 |
| 4,181,601 A | 1/1980 | Sze et al. | |
| 4,192,735 A | 3/1980 | Aldridge et al. | 208/112 |
| 4,325,802 A | 4/1982 | Porter et al. | 585/242 |
| 4,352,729 A * | 10/1982 | Jacquin et al. | 208/209 |
| 4,411,768 A | 10/1983 | Unger et al. | 208/59 |
| 4,422,927 A | 12/1983 | Kowalczyk et al. | 208/211 |
| 4,435,314 A | 3/1984 | van de Leemput et al. | 502/154 |
| 4,465,630 A | 8/1984 | Akashi et al. | |
| 4,467,049 A | 8/1984 | Yoshii et al. | 502/317 |
| 4,485,004 A | 11/1984 | Fisher et al. | 208/107 |
| 4,581,344 A | 4/1986 | Ledoux et al. | 502/304 |
| 4,585,545 A | 4/1986 | Yancey, Jr. et al. | |
| 4,590,172 A | 5/1986 | Isaacs | 502/160 |
| 4,592,827 A | 6/1986 | Galiasso et al. | 208/59 |
| 4,592,830 A | 6/1986 | Howell et al. | 208/94 |
| 4,606,809 A | 8/1986 | Garg | 208/59 |
| 4,633,001 A | 12/1986 | Cells | 554/71 |
| 4,652,311 A | 3/1987 | Gulla et al. | |
| 4,652,647 A | 3/1987 | Schlosberg et al. | |
| 4,693,991 A | 9/1987 | Bjornson et al. | |
| 4,695,369 A | 9/1987 | Garg et al. | 208/112 |
| 4,707,245 A | 11/1987 | Baldasarri et al. | 208/57 |
| 4,707,246 A | 11/1987 | Gardner et al. | |
| 4,713,167 A | 12/1987 | Reno et al. | 208/59 |
| 4,716,142 A | 12/1987 | Laine et al. | 502/220 |
| 4,734,186 A | 3/1988 | Parrott et al. | |
| 4,762,607 A | 8/1988 | Aldridge et al. | 208/59 |
| 4,762,814 A | 8/1988 | Parrott et al. | |
| 4,765,882 A | 8/1988 | Aldridge et al. | 208/59 |
| 4,770,764 A | 9/1988 | Ohtake et al. | 208/73 |
| 4,802,972 A | 2/1989 | Kukes et al. | |
| 4,812,228 A | 3/1989 | Angevine et al. | |

(Continued)

FOREIGN PATENT DOCUMENTS

CA 2004882 6/1991

(Continued)

OTHER PUBLICATIONS

Papaioannou et al., "Alkali-Metal- and Alkaline-Earth-Promoted Catalysts for Coal Liquefaction Applications", Energy & Fuels, vol. 4, No. 1, pp. 38-42 (1990).

(Continued)

*Primary Examiner*—Jerry Lorengo
*Assistant Examiner*—James E McDonough
(74) *Attorney, Agent, or Firm*—Workman Nydegger

(57) ABSTRACT

Bimetallic catalyst precursors are manufactured from a plurality of molybdenum atoms and a plurality of atoms of a secondary transition metal (e.g., one or more of cobalt, iron, or nickel). The molybdenum atoms and the secondary transition metal atoms are each bonded with a plurality of organic anions (e.g., 2-ethyl hexanoate) to form a mixture of an oil-soluble molybdenum salt and an oil-soluble secondary transition metal salt. The molybdenum and/or the secondary transition metals are preferably reacted with the organic agent in the presence of a strong reducing agent such as hydrogen. To obtain this mixture of metal salts, an organic agent is reacted with the molybdenum at a temperature between about 100° C. and about 350° C. The secondary transition metal is reacted with the organic agent at a different temperature, preferably between 50° C. and 200° C. The metal salts are capable of forming a hydroprocessing metal sulfide catalyst in heavy oil feedstocks.

28 Claims, No Drawings

U.S. PATENT DOCUMENTS

| | | | |
|---|---|---|---|
| 4,824,611 A | 4/1989 | Cells | 554/71 |
| 4,834,865 A | 5/1989 | Kukes et al. | 208/59 |
| 4,863,887 A | 9/1989 | Ohtake et al. | |
| 5,017,712 A | 5/1991 | Usui et al. | 549/529 |
| 5,114,900 A | 5/1992 | King et al. | |
| 5,171,916 A | 12/1992 | Le et al. | |
| 5,254,240 A * | 10/1993 | Galiasso et al. | 208/112 |
| 5,332,709 A | 7/1994 | Nappier et al. | 502/211 |
| 5,358,634 A | 10/1994 | Rankel | |
| 5,364,524 A | 11/1994 | Partridge et al. | |
| 5,372,705 A | 12/1994 | Bhattacharya et al. | 208/112 |
| 5,474,977 A | 12/1995 | Gatsis | |
| 5,578,197 A | 11/1996 | Cyr et al. | 208/112 |
| 5,622,616 A | 4/1997 | Porter et al. | 208/108 |
| 5,866,501 A | 2/1999 | Pradhan et al. | 502/338 |
| 5,868,923 A | 2/1999 | Porter et al. | 208/113 |
| 5,871,638 A | 2/1999 | Pradhan et al. | 208/422 |
| 5,916,432 A | 6/1999 | McFarlane et al. | 208/153 |
| 5,935,419 A | 8/1999 | Khan et al. | |
| 5,954,945 A | 9/1999 | Cayton et al. | 208/108 |
| 5,962,364 A | 10/1999 | Wilson, Jr. et al. | |
| 6,059,957 A | 5/2000 | Khan et al. | 208/108 |
| 6,068,758 A | 5/2000 | Strausz | 208/108 |
| 6,093,824 A | 7/2000 | Reichle et al. | |
| 6,136,179 A | 10/2000 | Sherwood, Jr. et al. | 208/109 |
| 6,139,723 A | 10/2000 | Pelrine et al. | 208/422 |
| 6,214,195 B1 | 4/2001 | Yadav et al. | |
| 6,274,530 B1 | 8/2001 | Cayton et al. | |
| 6,379,532 B1 | 4/2002 | Hoehn et al. | |
| 6,455,594 B1 | 9/2002 | Tsuji | |
| 6,462,095 B1 | 10/2002 | Bönsel et al. | |
| 6,596,155 B1 | 7/2003 | Gates et al. | |
| 6,660,157 B2 | 12/2003 | Que et al. | 208/108 |
| 6,686,308 B2 | 2/2004 | Mao et al. | |
| 6,712,955 B1 | 3/2004 | Hou et al. | 208/216 R |
| 6,884,340 B1 | 4/2005 | Bogdan | |
| 6,916,762 B2 | 7/2005 | Shibuya et al. | |
| 7,011,807 B2 | 3/2006 | Zhou et al. | |
| 7,090,767 B2 | 8/2006 | Kaminsky et al. | |
| 2002/0179493 A1 | 12/2002 | Etter | |
| 2003/0094400 A1 | 5/2003 | Levy et al. | |
| 2003/0171207 A1 | 9/2003 | Shih et al. | |
| 2004/0147618 A1 | 7/2004 | Lee et al. | |
| 2005/0109674 A1 | 5/2005 | Klein | |
| 2005/0241991 A1 | 11/2005 | Lott et al. | |
| 2005/0241992 A1 | 11/2005 | Lott et al. | |
| 2005/0241993 A1 | 11/2005 | Lott et al. | |
| 2005/0258073 A1 | 11/2005 | Oballa et al. | |
| 2005/0279670 A1 | 12/2005 | Long et al. | |
| 2006/0079396 A1 | 4/2006 | Saito | |
| 2006/0224000 A1 | 10/2006 | Papp et al. | |
| 2006/0254956 A1 | 11/2006 | Khan | |
| 2006/0289340 A1 | 12/2006 | Brownscombe et al. | |
| 2007/0012595 A1 | 1/2007 | Brownscombe et al. | |
| 2007/0158236 A1 | 7/2007 | Zhou et al. | |
| 2007/0158238 A1 | 7/2007 | Wu et al. | |
| 2007/0175797 A1 | 8/2007 | Iki et al. | |
| 2007/0209965 A1 | 9/2007 | Duddy et al. | |

FOREIGN PATENT DOCUMENTS

| | | | |
|---|---|---|---|
| CA | 2088402 | 7/1993 | |
| JP | 06346064 | 12/1994 | |
| NL | EP-0 199 399 A2 * | 10/1986 | 502/150 |
| WO | WO 2006116913 | 11/2006 | |

OTHER PUBLICATIONS

Office Action dated Apr. 2, 2009 cited in U.S. Appl. No. 11/327,085.

* cited by examiner

HYDROCARBON-SOLUBLE, BIMETALLIC CATALYST PRECURSORS AND METHODS FOR MAKING SAME

CROSS-REFERENCE TO RELATED APPLICATION

This application is a continuation-in-part of U.S. application Ser. No. 11/327,249, filed Jan. 6, 2006, now abandoned, the disclosure of which is incorporated herein in its entirety.

BACKGROUND OF THE INVENTION

1. The Field of the Invention

The present invention is in the field of upgrading heavy oil feedstocks into lower boiling, higher quality materials. More particularly, the invention relates to bimetallic catalyst precursors that can be mixed with heavy oil feedstocks to form, in situ, a hydrocracking catalyst and a method for making the catalyst precursors.

2. Related Technology

World demand for refined fossil fuels is ever-increasing and will eventually outstrip the supply of high quality crude oil. As the shortage of high quality crude oil increases, there is an increasing demand to find better ways to exploit lower quality feedstocks and extract fuel values from them.

Lower quality feedstocks are characterized by relatively high quantities of hydrocarbons that have a boiling point of 524° C. (975° F.) or higher. They also typically contain relatively high concentrations of sulfur, nitrogen and/or metals. High boiling fractions typically have a high molecular weight and/or low hydrogen/carbon ratio, an example of which is a class of complex compounds collectively referred to as "asphaltenes". Asphaltenes are difficult to process and commonly cause fouling of conventional catalysts and hydroprocessing equipment.

Examples of lower quality feedstocks that contain relatively high concentrations of asphaltenes, sulfur, nitrogen and metals include heavy crude, oil sands bitumen, and bottom of the barrel and residuum left over from conventional refinery processes (collectively "heavy oil"). The terms "bottom of the barrel" and "residuum" (or "resid") typically refer to atmospheric tower bottoms, which have a boiling point of at least 343° C. (650° F.), or vacuum tower bottoms, which have a boiling point of at least 524° C. (975° F.). The terms "resid pitch" and "vacuum residue" are commonly used to refer to fractions that have a boiling point of 524° C. (975° F.) or greater.

Converting heavy oil into useful end products requires extensive processing, including reducing the boiling point of the heavy oil, increasing the hydrogen-to-carbon ratio, and removing impurities such as metals, sulfur, nitrogen and carbon forming compounds.

When used with heavy oil, existing commercial catalytic hydrocracking processes become fouled or rapidly undergo catalyst deactivation. The undesirable reactions and fouling involved in hydrocracking heavy oil greatly increases the catalyst and maintenance costs of processing heavy oils, making current catalysts unsuitable for hydroprocessing heavy oil.

One promising technology for hydroprocessing heavy oils uses a hydrocarbon-soluble molybdenum salt that decomposes in the heavy oil during hydroprocessing to form, in situ, a hydroprocessing catalyst, namely molybdenum sulfide. One such process is disclosed in U.S. Pat. No. 5,578,197 to Cyr et al., which is incorporated herein by reference. Once formed in situ, the molybdenum sulfide catalyst is highly effective at breaking up asphaltenes and other complicated hydrocarbons while preventing fouling and coking.

A significant problem with commercializing oil soluble molybdenum catalysts is the cost of the catalyst. The catalyst is typically not recovered after use and is therefore a significant expense to upgrading heavy oils. Even small improvements in catalyst performance can significantly reduce the cost of hydrocracking heavy oils by reducing the amount of catalyst used and/or by increasing the output of usable fuels.

One way to reduce the cost of oil soluble molybdenum catalysts is to substitute a portion of the molybdenum with a less expensive transition metal such as cobalt, nickel, manganese, or iron. However, attempts to form oil-soluble, bimetallic salts containing molybdenum have had very little success. In current processes for manufacturing oil-soluble, bimetallic salts, the molybdenum and the second metal (e.g., cobalt) are mixed together and reacted with an organic acid. In this reaction, most or all of the second metal precipitates without forming the desired salt. The precipitated metal cannot easily be mixed with heavy oil to form a hydrocracking catalyst. Due to problems with precipitation, oil-soluble, bimetallic catalyst precursors for hydrocracking heavy oil are currently not readily available.

SUMMARY OF THE INVENTION

The present invention relates to bimetallic catalyst precursors having hydrocarbon-soluble metal salts that can form a molybdenum sulfide catalyst in situ for use in hydrocracking heavy oil and methods for making the catalyst precursors. The catalyst precursor includes an oil soluble molybdenum salt that includes a plurality of molybdenum atoms that are each bonded to a plurality of organic anions. The catalyst precursor also includes a second transition metal salt that includes a plurality of transition metal atoms other than molybdenum (e.g., cobalt). The second transition metal salt is also oil soluble, having a plurality of organic anions bonded to each metal atom thereof. The molybdenum salts and the secondary transition metal salts are included in the catalyst precursor in a molar ratio of the molybdenum to the secondary transition metal of between about 98:1 and about 1:10, more preferably between about 95:1 and about 1:5, even more preferably between about 10:1 and about 1:1, and most preferably between about 8:1 and about 2:1. The preferred secondary transition metal is cobalt, nickel, iron, manganese, or a combination of these.

The present invention also includes methods of making the bimetallic catalyst precursors. Methods for making the catalyst precursors generally include (1) providing a plurality of molybdenum atoms and a plurality of secondary transition metal atoms (e.g., cobalt); (2) providing an organic agent comprising a plurality of organic molecules, preferably having between 2 and 14 carbon atoms and at least one functional group capable of reacting with the molybdenum and the secondary transition metal atoms; (3) reacting the plurality of molybdenum atoms with the organic agent at a temperature between 100° C. and 300° C.; and (4) reacting the secondary transition metal atoms at a different temperature between about 50° C. and 160° C.

In one embodiment, the reaction is carried out by first reacting the organic agent with the molybdenum atoms and then adjusting the temperature of the reaction mixture to a second temperature. The secondary transition metal is added to the reaction mixture and, optionally, an additional amount of organic agent. The reaction of the secondary transition metal and the organic agent is carried out at the second temperature in the presence of the molybdenum salt to form an oil soluble salt of the secondary transition metal that is mixed with the molybdenum salt.

Alternatively, the secondary transition metal atoms can be reacted with the organic agent in a reaction apart from the oil-soluble molybdenum salt. The metal salt of the secondary transition metal can then be mixed with the molybdenum salt at a temperature below about 150° C. to form a bimetallic catalyst precursor.

Reacting the molybdenum atoms with the organic agent at a different temperature and/or in a separate reaction vessel than the reaction with the secondary transition metal and organic agent reduces the likelihood that the secondary transition metal will precipitate during the reaction. Whether the molybdenum or the secondary transition metal will precipitate depends significantly on the solubility and stability of the individual metals in the reaction mixture. Typically solubility increases with increasing temperature, and stability decreases with increasing temperature. By performing the reactions at separate temperatures and/or in separate vessels, the solubility and stability can be optimized for both molybdenum and the secondary transition metals.

The inventors have found that bimetallic catalyst precursors manufactured according to the present invention readily form a molybdenum sulfide based catalyst upon decomposition in heavy oil. The catalyst precursors typically decompose to form CoS and CoMoS. The bimetallic catalyst precursors of the present invention can be manufactured more economically than molybdenum-only catalyst due to the lower price of many of the secondary transition metals (e.g., iron, nickel, cobalt, and manganese).

Surprisingly, the bimetallic catalyst precursors of the present invention also perform better in hydrocracking processes than molybdenum-only catalyst precursors. For example, a 70/30 mixture of a molybdenum/cobalt catalyst precursor according to the present invention yielded greater than 6% more product in a hydrocracking process than a molybdenum-only catalyst precursor manufactured using a similar method and an equal amount of metal.

It is currently believed that the increased hydrocracking performance is due to the synergetic effect of Mo and Co. Cobalt has a stronger attraction for sulfur than molybdenum. This greater attraction is due to the electronic configurations of molybdenum and cobalt, which are [Kr] $4d^5 5s^1$ and [Ar] $3d^7 4s^2$, respectively (for the ground state). Sulfur has a greater attraction for cobalt because it can more easily react with the two 4s orbitals in Cobalt than the one $5s^1$ and three 4d orbitals in molybdenum. When a molecular complex is formed with both molybdenum and cobalt, the cobalt becomes a promoter by attracting the sulfur and then transferring it to the molybdenum, which is within atomic distance.

In another embodiment, the catalyst precursors are preferably made using a strong reducing agent such as hydrogen. The reducing agent reduces and stabilizes the molybdenum atoms during the reaction between the organic agent, the molybdenum atoms, and/or the secondary transition metal atoms. Preferably, at least a portion of the molybdenum atoms are reduced to a 3+ oxidation state. Preferably, water is also removed to make the reaction product soluble in heavy oil.

It is believed that the reducing agent can be helpful in reducing the amount of molybdenum oxides remaining in the final product and/or to reduce the amount of water bound to the molybdenum atoms and/or molybdenum salts. Hydrogen can be particularly effective at removing molybdenum oxides and/or water bound to the molybdenum salts. Catalyst precursors manufactured in the presence of hydrogen and/or organic reducing agents under the reaction conditions described herein have been found to have particularly good solubility and dispersion in hydrocarbons. It is believed that this increased solubility over existing catalyst precursors is due in part to the elimination of molybdenum oxides and/or to removal of bound water and/or undesired molybdenum complexes. However, the invention is not limited to these features of the invention.

The hydroprocessing catalyst can be used in various kinds of reactors and hydrocracking processes to upgrade heavy oil. The hydroprocessing catalyst of the present invention can more effectively process asphaltene molecules, reduce or eliminate the formation of coke precursors and sediment, reduce equipment fouling, and/or increase conversion rates as compared to conventional hydroprocessing catalysts.

These and other benefits of the present invention will become more fully apparent from the following description and appended claims as set forth below.

DETAILED DESCRIPTION OF THE PREFERRED EMBODIMENTS

I. Introduction and Definitions

The present invention relates to hydrocarbon-soluble, bimetallic catalyst precursors that can form a hydroprocessing molybdenum sulfide catalyst in heavy oil feedstocks, and methods of making the catalyst precursor. The bimetallic catalyst precursors include a plurality of molybdenum atoms and a plurality of atoms of a secondary transition metal (e.g., cobalt). The molybdenum atoms and the secondary transition metal atoms are each bonded with a plurality of organic anions (e.g., 2-ethyl hexanoate) to form a mixture of an oil-soluble molybdenum salt and an oil-soluble secondary transition metal salt. To obtain this mixture of metal salts, an organic agent is reacted with the molybdenum at a temperature between about 100° C. and about 300° C. The secondary transition metal is reacted with the organic agent at a different temperature, typically between about 50° C. and about 160° C. The molybdenum and/or the secondary transition metals are also preferably reacted with the organic agent in the presence of a strong reducing agent such as hydrogen.

The terms "colloidal catalyst" and "colloidally-dispersed catalyst" shall refer to catalyst particles having a particle size that is colloidal in size, e.g., less than about 100 nm in diameter, preferably less than about 10 nm in diameter, more preferably less than about 5 nm in diameter, and most preferably less than about 3 nm in diameter. The term "colloidal catalyst" includes, but is not limited to, molecular or molecularly-dispersed catalyst compounds.

The terms "molecular catalyst" and "molecularly-dispersed catalyst" shall refer to catalyst compounds that are essentially "dissolved" or completely dissociated from other catalyst compounds or molecules in a heavy oil hydrocarbon feedstock, non-volatile liquid fraction, bottoms fraction, resid, or other feedstock or product in which the catalyst may be found. It shall also refer to very small catalyst particles that only contain a few catalyst molecules joined together (e.g., 15 molecules or less).

The term "blended feedstock composition" shall refer to a heavy oil feedstock into which an oil soluble catalyst precursor composition has been combined and mixed sufficiently so that, upon decomposition of the catalyst precursor and formation of the catalyst, the catalyst will comprise a colloidal or molecular catalyst dispersed within the feedstock.

The term "heavy oil feedstock" shall refer to heavy crude, oil sands bitumen, bottom of the barrel and resid left over from refinery processes (e.g., visbreaker bottoms), and any other lower quality material that contains a substantial quantity of high boiling hydrocarbon fractions (e.g., that boil at or above 343° C. (650° F.), more particularly at or above about 524° C. (975° F.)), and/or that include a significant quantity of asphaltenes that can deactivate a solid supported catalyst and/or cause or result in the formation of coke precursors and sediment. Examples of heavy oil feedstocks include, but are not limited to, Lloydminster heavy oil, Cold Lake bitumen, Athabasca bitumen, atmospheric tower bottoms, vacuum tower bottoms, residuum (or "resid"), resid pitch, vacuum residue, and nonvolatile liquid fractions that remain after subjecting crude oil, bitumen from tar sands, liquefied coal, or coal tar feedstocks to distillation, hot separation, and the like and that contain higher boiling fractions and/or asphaltenes.

II. Components Used to Manufacture the Catalyst Precursors

The manufacture of the catalyst precursors of the present invention generally involves reacting a plurality of molybdenum atoms with a plurality of organic agent molecules at a first temperature and reacting a plurality of secondary transition metal atoms with a plurality of organic agent molecules at a second temperature. If needed, the reaction can be carried out in a solvent and/or in the presence of a reducing agent.

A. Transition Metal Atoms

The primary metal component of the oil catalyst precursors is molybdenum. The molybdenum atoms are provided as a molybdenum compound that is capable of reacting with an organic agent (e.g., a carboxylic acid such as 2-ethyl hexanoic acid) to form a molybdenum salt. Suitable molybdenum compounds include molybdenum halides, such as molybdenum hexafluoride and molybdenum pentachloride, the various oxides of molybdenum, such as molybdenum dioxide, trioxide and sesquioxide, and the like; alkali and alkali earth molybdates such as cesium molybdate, sodium molybdate, potassium molybdate, calcium molybdate and the like; and ammonium molybdate or molybdic acid. In the preferred embodiment of this invention, molybdic acid is used.

The secondary transition metal can be any transition metal other than molybdenum, including but not limited to tungsten, vanadium, titanium, chromium, manganese, iron cobalt, and nickel, alone or in combination, with metals from the first row transition metals of the periodic table being preferred. Even more preferred are cobalt, nickel, and iron. Nickel or a combination of nickel and iron are preferred due to their lower cost compared to cobalt.

The secondary transition metals are typically provided as a salt or hydroxide. Suitable metal compounds include cobalt (II) hydroxide, nickel (II) hydroxide, hydrated iron (III) oxide (FeO(OH)), manganese (II) oxide. Other suitable metals include metal halides, metal nitrates, and metal sulfates such as $FeCl_3$, $Fe(NO)_3$, and $Fe_2(SO_4)_3$.

B. Organic Agent Molecules

The organic agent is one or more oil-soluble organic compounds preferably having between 2 and 14 carbon atoms and a functional group suitable for reacting with a transition metal to form the anion of an oil soluble transition metal salt (e.g., a molybdenum salt). In a preferred embodiment, the organic agent is a carboxylic acid. Suitable carboxylic acids include aliphatic acids, alicyclic acids, aromatic acids, and phosphor containing acids. Suitable aliphatic acids include butanoic acid, pentanoic acid, hexanoic acid, heptanoic acid, octanoic acid, decanoic acid, carboxylic acids with side chains located at the α, β, or γ positions (e.g., 2-ethyl butanoic acid, 2-methyl pentanoic acid, 2-ethyl hexanoic acid), and the like. Alicyclic acids include cyclohexanoic, cyclododecanoic and the like. Aromatic acid may contain one or two fused rings and contain from 7 to 14 carbon atoms where the carboxyl group may or may not be attached to the ring; such as benzoic, 1 or 2 naphthoic, o-, m-, p-toluic, phenylacetic, 1 or 2 naphthalene acetic, phenylbutyric acid, and the like. Phosphor-containing organic compounds include 2-ethylhexyl phosphate and the like. Aliphatic acids are preferred and 2-ethyl hexanoic acid is particularly preferred for its solubility in heavy oil and its relatively low cost.

Those skilled in the art will recognize that the organic agent molecules can be modified during the reaction with the molybdenum atoms. For example, in the reaction of a carboxylic acid with molybdenum the organic agent molecules can lose hydrogen to become a carboxylate anion.

In some cases, the organic agent can function as a solvent for the reaction. This is typically the case where the organic agent is a liquid under the reaction conditions (e.g., 2-ethyl hexanoic acid). However, if needed, other solvents can be used. The additional solvent should dissolve the organic agent and the molybdenum atoms and/or the secondary transition metal atoms and not interfere with the reaction between them. Suitable solvents include decant oil, liquid paraffin wax, benzene, toluene, xylene, naphtha, mineral oil, mineral spirits, combinations thereof, and the like.

C. Reducing Agents

The reducing agent is added to the reaction mixture to reduce the metal atoms to more readily form the metal salts and/or to obtain metal salts with a desired weight % of metal in the catalyst precursor. In a preferred embodiment, a strong reducing agent is used to reduce and/or maintain at least a portion of the molybdenum atoms in an oxidation state below 4+. The molybdenum atoms preferably have an average oxidation state less than about 3.8+, more preferably less than about 3.5+.

Any reducing agent that can reduce the molybdenum and/or the secondary transition metals can be used. In a preferred embodiment, the reducing agent is a strong reducing agent that can reduce molybdenum to a 3+ oxidation state under the reaction conditions described herein. Suitable reducing agents include methane, ethane, olefins such as ethylene and propylene, aldehydes such as formaldehyde, and hydrogen. Hydrogen gas is a particularly preferred reducing agent because of its effectiveness and cost.

The suitability of the reducing agent often depends on the temperature at which the reaction is performed. At higher temperatures (e.g., 155° C.), organic reducing agents such as methane and formaldehyde have suitable reducing potential. However, at low temperatures (e.g., below 50° C.) or room temperature it can be advantageous to use a stronger reducing agent such as hydrogen gas.

III. Methods of Making Hydroprocessing Catalyst Precursors

The process for making hydroprocessing catalyst precursors according to the present invention comprises carrying out a first reaction between a plurality of molybdenum atoms and a plurality of organic agent molecules (e.g., 2-ethyl hexanoic acid) at a first temperature and carrying out a second reaction between a plurality of organic agent molecules (e.g., 2-ethyl hexanoic acid) and a plurality of atoms of a second transition metal (e.g., cobalt) at a second temperature. The reactions yield bimetallic, oil-soluble catalyst precursors that are suitable for in situ formation of a metal sulfide catalyst in heavy oil.

The first and second reactions are independently optimized to prevent molybdenum and/or the secondary transition metal from precipitating during the reaction yet still obtain high yields of the metal salt. The optimal reaction temperature depends on the particular transition metal compound and the organic agent being reacted. The preferred temperature for reacting molybdenum compounds (e.g., with 2-ethyl hexanoic acid) is typically between about 100° C. and about 350° C., more preferably between about 120° C. and about 280° C., and most preferably between about 155° C. and about 260° C.

The preferred temperature for reacting the secondary transition metal with the organic agent is typically between about 50° C. and about 200° C., and more preferably between about 100° C. and 150° C. The particular temperature used during the reaction will depend on the amount of metal precipitate that forms at a given temperature for a given organic agent. In general, the reaction with the molybdenum compound is performed at a higher temperature than the reaction with the secondary transition metal (e.g., cobalt). Those skilled in the art will be able to select an optimal reaction temperature for the first and second reactions and an organic agent using the teachings disclosed herein.

The molybdenum salt and the secondary transition metal salt are mixed to form a bimetallic catalyst precursor. The salts can be mixed in at least two different ways. In one embodiment, the salts are mixed by performing the second reaction in the presence of the molybdenum salt. In this embodiment, the molybdenum salt is formed and the temperature of the reaction mixture is adjusted to a temperature suitable for the reaction with the secondary transition metal. The secondary transition metal compound is combined with the molybdenum salt and optionally with an additional amount of organic agent and reacted to form the oil-soluble secondary transition metal salt.

In an alternative embodiment, the molybdenum salt and the secondary transition metal salt are formed in separate vessels under suitable reaction conditions and then mixed together at a temperature below the decomposition temperature of the metal salts to form the bimetallic catalyst precursor. In a preferred embodiment, the separate salts are mixed together at a temperature between ambient temperature and about 150° C.

Using the method of the present invention, a hydrocarbon-soluble, bimetallic catalyst can be formed that has a desired ratio of molybdenum to secondary transition metals. In a preferred embodiment, the molar ratio of molybdenum to secondary transition metals is between 98:1 and about 1:10, more preferably between about 95:1 and about 1:5, even more preferably between about 10:1 and about 1:1, and most preferably between about 8:1 and about 2:1. Combinations of metal salts in these ratios show significant improvement in heavy oil upgrading as compared to hydrocracking performed with molybdenum-only catalyst precursors.

The bimetallic catalyst precursors of the present invention have shown superior results when used in a hydrocracking process as compared to molybdenum-only catalyst precursors. While the reasons for improved performance are not completely known, the inventors currently believe that the second metal acts as a promoter in the formation of the metal sulfide hydrocracking catalyst.

In one exemplary embodiment of the invention, cobalt is used as the second metal. Particularly preferred ratios of molybdenum to cobalt are between about 5:1 to about 1:1. It has been found that cobalt is particularly useful to assist in the formation of the metal sulfide hydrocracking catalysts. Bimetallic catalyst precursors containing cobalt are believed to have improved performance over molybdenum-only catalyst precursor because of cobalt's ability to more easily bond with sulfur. The cobalt atoms bond with the sulfur atoms and then transfer the sulfur atoms to the molybdenum atoms, which are within atomic distances in the bimetallic metal salts.

The use of cobalt is also preferred for its ability to remove sulfur from heavy oil. The cobalt is present as a sulfide salt. The sulfide salt can form a catalyst with $MoS_2$ to make a CoMoS compound, which can promote the formation of $H_2S$. Sulfur in the heavy oil that is converted to $H_2S$ by CoMoS can be easily collected from the oil as a gas.

Although cobalt provides excellent catalytic activity and is less expensive than molybdenum, less expensive still are nickel and especially iron. Catalysts containing iron and/or nickel as the second metal have been shown to have similar or better activity compared to conventional catalysts containing molybdenum alone. Even if catalytic activity for a catalyst containing a mixture of molybdenum and nickel and/or iron is no different than a catalyst containing molybdenum alone, the tremendous cost saving achieved by replacing the much more expensive molybdenum with the far less expensive nickel and/or iron make the mixed catalyst an attractive candidate from an economic standpoint.

In a preferred embodiment, the molybdenum reaction and/or the reaction with the secondary transition metal is carried out in a way that achieves a hydrocarbon-soluble molybdenum salt that has molybdenum atoms with an average oxidation state of less than 4+. In one embodiment, molybdenum salts having molybdenum atoms in an oxidation state less than 4+ can be obtained by reacting the molybdenum compound and the organic agent molecules in a molar ratio of molybdenum atoms to organic agent molecules of less than 1:4, preferably less than about 1:3.8, and more preferably less than about 1:3.5. A strong reducing agent is included in the reaction mixture in an amount sufficient to reduce and maintain at least a portion of the molybdenum atoms in a 3+ oxidation state. In a preferred embodiment, the reducing agent is hydrogen gas, which is passed through or by the reaction mixture to produce the reducing environment.

Maintaining a reducing environment during the reaction can be particularly advantageous because it causes the reaction between the molybdenum and the organic agent to occur more quickly. In addition, the presence of the hydrogen reduces the opportunity for the organic agent molecules to oxidize one another, which could otherwise result in the formation of undesired molybdenum complexes. The presence of the reducing agent during the reaction also helps stabilize the molybdenum atoms in the 3+ oxidation state, which is an oxidation state that can be less stable than other oxidation states, such as 4+.

In a preferred embodiment, water is removed from the reaction mixture to obtain a reaction product that is soluble in heavy oil and to ensure that the molybdenum reaction proceeds. The water can be removed using any technique or combination of techniques. In a preferred embodiment, the reaction is carried out under conditions that exceed the boiling point of water such that water is removed as it is formed during the reaction. The water is allowed to escape from the reaction vessel as water vapor. Where hydrogen and/or another gas is contacted with the reaction mixture, the water can escape with the gas. If desired, the gas and water vapor can be passed through a condenser to remove the water. Optionally, the gas can then be recycled through the reaction mixture.

It is believed that the reducing agent can be helpful to reduce the amount of molybdenum oxides remaining in final product and/or to reduce the amount of water bound to the molybdenum atoms and/or molybdenum salts. Hydrogen can be particularly effective at removing molybdenum oxides and/or water bound to the molybdenum salts. Catalyst precursors manufactured in the presence of hydrogen and/or organic reducing agents under the reaction conditions described herein have been found to have particularly good solubility and dispersion in hydrocarbons. It is believed that this increased solubility over existing catalyst precursors is due in part to the elimination of molybdenum oxides and/or to removal of bound water and/or undesired molybdenum complexes. It can also be beneficial to purge the reaction mixture prior to adding the reducing agent.

The use of a reducing agent can also improve the weight percent of metal in the catalyst precursors. The percent metal in the metal salts is directly dependent on the number of organic anions bound to the metals and the molecular weight of the organic anions. As the number and weight of the organic anion increases, the weight percent of metal decreases. As mentioned above, higher weight percent metal is desired, so long as the catalyst precursor is soluble in hydrocarbons such as heavy oil. The inventors of the present invention have found that the number of organic anions per metal atom can be reduced (e.g., to 3 for molybdenum) while still maintaining sufficient solubility in hydrocarbons such as heavy oil.

The reduced number of organic anions for at least a portion of the molybdenum salts of the present invention results in a catalyst precursor with an increase in weight percent of metal. For example, where the organic anion is 2-ethyl hexanoate, a catalyst precursor having molybdenum atoms with an average oxidation of between 3 and 4 (preferably less than about 3.8+, more preferably less than about 3.5+) can have a weight percent between 19% and 14%. Thus, the weight percent of molybdenum can be increased without adversely affecting solubility by reducing the oxidation state of the molybdenum and consequently the number of organic anions bonded thereto.

IV. Hydrocarbons Blended with Catalyst Precursor and Hydroprocessing Catalyst Formed Therefrom The catalyst precursors of the present invention can be included in a heavy oil feedstock to form a blended catalyst precursor. The catalyst precursors are designed to remain stable in a hydrocarbon up to a desired temperature. At an elevated temperature, the catalyst precursors decompose and react with sulfur in the heavy oil to form a molybdenum sulfide hydroprocessing catalyst.

The oil soluble catalyst precursors preferably have a decomposition temperature in a range from about 100° C. (212° F.) to about 350° C. (662° F.), more preferably in a range of about 150° C. (302° F.) to about 300° C. (572° F.), and most preferably in a range of about 175° C. (347° F.) to about 250° C. (482° F.). These preferred decomposition temperatures allow the catalyst precursor to be thoroughly mixed in a hydrocarbon (e.g., heavy oil) before decomposition occurs.

The catalyst precursor compositions can also be mixed with a diluent to form a mixture with a desirable concentration of molybdenum salt. Examples of suitable hydrocarbon diluents include, but are not limited to, vacuum gas oil (which typically has a boiling range of 360-524° C.), decant oil or cycle oil (which typically has a boiling range of 360-550° C.), and light gas oil (which typically has a boiling range of 200-360° C.).

The weight ratio of catalyst precursor composition to hydrocarbon oil diluent is preferably in a range of about 1:1000 to about 1:1, more preferably in a range of about 1:100 to about 1:1, and most preferably in a range of about 1:30 to about 1:1 (e.g., 1:10, 1:5 or 1:3).

The catalyst precursor composition can also be pre-mixed with a diluent prior to mixing the precursor with the heavy oil feedstock. The catalyst precursor composition is advantageously mixed with the hydrocarbon diluent at a temperature below which a significant portion of the catalyst precursor composition starts to decompose, preferably, at temperature in a range of about 25° C. to about 250° C., more preferably in range of about 50° C. to about 200° C., and most preferably in a range of about 75° C. to about 150° C., to form the diluted precursor mixture. It will be appreciated that the actual temperature at which the diluted precursor mixture is formed typically depends largely on the decomposition temperature of the particular precursor composition that is utilized. The precursor composition is preferably mixed with the hydrocarbon oil diluent for a time period in a range of about ½ minute to about 20 minutes, more preferably in a range of about ¾ minute to about 10 minutes, and most preferably in a range of about 1 minute to about 3 minutes. The actual mixing time is dependent, at least in part, on the temperature (which affects the viscosity of the fluids) and mixing intensity. Mixing intensity is dependent, at least in part, on the number of mixing stages (e.g., for an in-line static mixer).

Whereas it is within the scope of the invention to directly blend the catalyst precursor composition with the heavy oil feedstock, care must be taken in such cases to mix the components for a time sufficient to thoroughly blend the precursor composition within the feedstock before substantial decomposition of the precursor composition has occurred. For example, U.S. Pat. No. 5,578,197 to Cyr et al. describes a method whereby molybdenum 2-ethyl hexanoate was mixed with bitumen vacuum tower residuum for 24 hours before the resulting mixture was heated in a reaction vessel to form the catalyst compound and to effect hydrocracking (see col. 10, lines 4-43). Whereas 24-hour mixing in a testing environment may be entirely acceptable, such long mixing times may make certain industrial operations prohibitively expensive.

It has been found that pre-blending the precursor composition with a hydrocarbon diluent prior to blending the diluted precursor mixture with the heavy oil feedstock greatly aids in thoroughly and intimately blending the precursor composition within the feedstock, particularly in the relatively short period of time required for large-scale industrial operations to be economically viable. Forming a diluted precursor mixture shortens the overall mixing time by (1) reducing or eliminating differences in solubility between the more polar catalyst precursor composition and the heavy oil feedstock, (2) reducing or eliminating differences in rheology between the catalyst precursor composition and the heavy oil feedstock, and/or (3) breaking up the catalyst precursor molecules to form a solute within a hydrocarbon oil diluent that is much more easily dispersed within the heavy oil feedstock. It is particularly advantageous to first form a diluted precursor mixture in the case where the heavy oil feedstock contains water (e.g., condensed water). Otherwise, the greater affinity of the water for the polar catalyst precursor composition can cause localized agglomeration of the precursor composition, resulting in poor dispersion and formation of micron-sized or larger catalyst particles. The hydrocarbon oil diluent is preferably substantially water-free to prevent the formation of substantial quantities of micron-sized or larger catalyst particles. The diluted catalyst precursor preferably has a total metal concentration between about 10 ppm and 15,000 ppm, more preferably between about 500 ppm and 10,000 ppm.

The diluted precursor mixture is then combined with the heavy oil feedstock and mixed for a time sufficient and in a manner so as to disperse the catalyst precursor composition throughout the feedstock in order to yield a conditioned feedstock composition in which the precursor composition is thoroughly mixed within the heavy oil feedstock. In order to obtain sufficient mixing of the catalyst precursor composition within the heavy oil feedstock so as to yield a colloidal or molecular catalyst upon decomposition of the precursor composition, the diluted precursor mixture and heavy oil feedstock are preferably mixed for a time period in a range of about ½ minute to about 20 minutes, more preferably in a range from about 1 minute to about 10 minutes, and most preferably in a range of about 2 minutes to about 5 minutes. Increasing the vigorousness and/or shearing energy of the mixing process generally reduces the time required to effect thorough mixing.

Examples of mixing apparatus that can be used to effect thorough mixing of the catalyst precursor composition and heavy oil feedstock include, but are not limited to, high shear mixing such as mixing created in a vessel with a propeller or turbine impeller, multiple static in-line mixers, or one or more multi-stage centrifugal pumps. According to one embodiment, continuous rather than batch-wise mixing can be carried out using high energy pumps having multiple chambers within which the catalyst precursor composition and heavy oil feedstock are churned and mixed as part of the pumping process itself. The foregoing mixing apparatus may also be used for the pre-mixing process discussed above in which the catalyst precursor composition is mixed with the hydrocarbon oil diluent to form the catalyst precursor mixture. An example of mixing apparatus that can be used to thoroughly blend the catalyst precursor composition within a heavy oil feedstock is disclosed in U.S. application Ser. No. 11/374,369, filed Mar. 13, 2006 and entitled METHODS AND MIXING SYSTEMS FOR INTRODUCING CATALYST PRECURSOR INTO HEAVY OIL FEEDSTOCK, For purpose of disclosing such mixing apparatus, the foregoing application is incorporated herein by specific reference.

In the case of heavy oil feedstocks that are solid or extremely viscous at room temperature, such feedstocks may advantageously be heated in order to soften them and create a feedstock having sufficiently low viscosity so as to allow good mixing of the oil soluble catalyst precursor into the feedstock composition. In general, decreasing the viscosity of the heavy oil feedstock will reduce the time required to effect thorough and intimate mixing of the oil soluble precursor composition within the feedstock. However, the feedstock should not be heated to a temperature above which significant decomposition of the catalyst precursor composition occurs until after thorough and complete mixing to form the blended feedstock composition. Prematurely decomposing the catalyst precursor composition generally results in the formation of micron-sized or larger catalyst particles rather than a colloidal or molecular catalyst. The heavy oil feedstock and diluted precursor mixture are preferably mixed and conditioned at a temperature in a range of about 25° C. to about 350° C., more preferably in a range of about 50° C. to about 300° C., and most preferably in a range of about 75° C. to about 250° C. to yield the conditioned feedstock.

After the catalyst precursor composition has been well-mixed throughout the heavy oil feedstock so as to yield the conditioned feedstock composition, this composition is then heated to above the temperature where significant decomposition of the catalyst precursor composition occurs in order to liberate the catalyst metal therefrom so as to form the final active catalyst. According to one embodiment, the metal from the precursor composition is believed to first form a metal oxide, which then reacts with sulfur liberated from the heavy oil feedstock to yield a metal sulfide compound that is the final active catalyst. In the case where the heavy oil feedstock includes sufficient or excess sulfur, the final activated catalyst may be formed in situ by heating the heavy oil feedstock to a temperature sufficient to liberate the sulfur therefrom. In some cases, sulfur may be liberated at the same temperature that the precursor composition decomposes. In other cases, further heating to a higher temperature may be required.

If the oil soluble catalyst precursor composition is thoroughly mixed throughout the heavy oil feedstock, at least a substantial portion of the liberated metal ions will be sufficiently sheltered or shielded from other metal ions so that they can form a molecularly-dispersed catalyst upon reacting with sulfur to form the metal sulfide compound. Under some circumstances, minor agglomeration may occur, yielding colloidal-sized catalyst particles. However, it is believed that taking care to thoroughly mix the precursor composition throughout the feedstock will yield individual catalyst molecules rather than colloidal particles. Simply blending, while failing to sufficiently mix, the catalyst precursor composition with the feedstock typically causes formation of large agglomerated metal sulfide compounds that are micron-sized or larger.

In order to form the metal sulfide catalyst, the blended feedstock composition is preferably heated to a temperature in a range of about 200° C. to about 500° C., more preferably in a range of about 250° C. to about 450° C., and most preferably in a range of about 300° C. to about 400° C. According to one embodiment, the conditioned feedstock is heated to a temperature that is about 100° C. less than the hydrocracking temperature within the hydrocracking reactor. According to one embodiment, the colloidal or molecular catalyst is formed during preheating before the heavy oil feedstock is introduced into the hydrocracking reactor. According to another embodiment, at least a portion of the colloidal or molecular catalyst is formed in situ within the hydrocracking reactor itself. Once formed, in some cases, the colloidal or molecular catalyst can be formed as the heavy oil feedstock is heated to a hydrocracking temperature prior to or after the heavy oil feedstock is introduced into a hydrocracking reactor. The initial concentration of the catalyst metal in the colloidal or molecular catalyst is preferably in a range of about 1 ppm to about 500 ppm by weight of the heavy oil feedstock, more preferably in a range of about 5 ppm to about 300 ppm, and most preferably in a range of about 10 ppm to about 175 ppm. The catalyst may become more concentrated as volatile fractions are removed from non-volatile resid fraction.

While the highly polar nature of the catalyst compound causes or allows the colloidal or the molecular catalyst to associate with asphaltene molecules, it is the general incompatibility between the highly polar catalyst compound and the hydrophobic heavy oil feedstock that necessitates the aforementioned intimate or thorough mixing of the oil soluble catalyst precursor composition within the heavy oil feedstock prior to decomposition of the precursor and formation of the colloidal or molecular catalyst. Because metal catalyst compounds are highly polar, they cannot be effectively dispersed within a heavy oil feedstock in colloidal or molecular form if added directly thereto or as part of an aqueous solution or an oil and water emulsion such methods inevitably yield micron-sized or larger catalyst particles.

V. Examples

The following examples provide exemplary formulas for manufacturing catalyst precursors according to the present invention. Examples 1-9 provide formulas for making bimetallic salts. In examples 1-9, the metal salts were prepared using a condenser attached to a flask. Condensate was removed by opening a valve. Examples 10-12 describe the use of catalyst precursors in a hydrocracking process. Examples actually performed are described in past tense.

Hypothetical examples that can be carried out using the present invention are described in present tense.

Example 1

Example 1 describes a method for making a molybdenum-cobalt catalyst precursor with 80:20 ratio of molybdenum to cobalt by weight. 30.0 g of molybdic acid (Aldrich, $MoO_3 \geqq 85.0\%$) and 102.2 g of 2-ethyl hexanoic acid (Aldrich, 99%) were mixed together in a 300 ml flask, and then heated at 200° C. for 1 hour while stirring and purging with 100 ml/min of $N_2$. The purging was switched to a mixture of 20% $H_2$ and 80% $N_2$ and held for 12 hours at 200° C. The reaction yielded molybdenum 2-ethyl hexanoate with 14.7 wt % Mo.

2.8 g of cobalt(II) hydroxide (Aldrich, $Co(OH)2 > 95.0\%$) and 17.28 g of 2-ethyl hexanoic acid (Aldrich, 99%) were mixed together in a 250 ml of flask, and then heated to approximately 140° C. for 8 hours. The reaction yielded cobalt 2-ethyl hexanoate with 9.0 wt % Co. 15.0 g of the molybdenum 2-ethyl hexanoate was mixed with 6.1 g of the cobalt 2-ethyl hexanoate at room temperature to yield a bimetallic, oil soluble catalyst precursor with 13.0% metal by weight.

Example 2

Example 2 describes a method for making a molybdenum-cobalt-phosphorus catalyst precursor. 30.0 g of molybdic acid (Aldrich, $MoO3 \geqq 85.0\%$) and 102.2 g of 2-ethyl hexanoic acid (Aldrich, 99%) were mixed together in a 300 ml flask and heated at 200° C. for 1 hour while stirring and purging with 100 ml/min of $N_2$. The mixture was then purged for another 12 hours with a mixture of 20% $H_2$ and 80% $N_2$ at the same temperature. The reaction yielded molybdenum 2-ethyl hexanoate containing 14.6 wt % Mo.

2.8 g of cobalt(II) hydroxide (Aldrich, $Co(OH)_2 > 95.0\%$) and 17.28 g of 2-ethyl hexanoic acid (Aldrich, 99%) were mixed together in a 250 ml flask and heated at ~140° C. for 8 hours. The resulting cobalt 2-ethyl hexanoate contained 9.0 wt % Co.

15.0 g of molybdenum 2-ethyl hexanoate (Mo Content=14.6 wt %) was mixed with 6.1 g of cobalt 2-ethyl hexanoate (Co Content=9.0 wt %) and 27.66 grams of 2-ethylhexyl phosphate, thus producing molybdenum-cobalt-phosphorus catalyst.

Example 3

Example 3 describes a method for making a molybdenum-cobalt catalyst precursor with 80:20 ratio of molybdenum to cobalt. 30.0 g of molybdic acid (Aldrich, $MoO_3 \geqq 85.0\%$) and 102.2 g of 2-ethyl hexanoic acid (Aldrich, 99%) were mixed together in a 300 ml of flask and then heated to 200° C. for 1 hour while stirring and purging with 100 ml/min of $N_2$. The purging was switched to a mixture of 20% $H_2$ and 80% $N_2$ and held for 12 hours at 200° C. The reaction yielded molybdenum 2-ethyl hexanoate with 14.6 wt % Mo.

15.0 g of the molybdenum 2-ethyl hexanoate was mixed with 0.91 g of cobalt (II) hydroxide (Aldrich, 95 wt %) and 5.4 g of 2-ethyl hexanoic acid (Aldrich, 99%), and then heated to 140° C. and held for 3 hours. The reaction yielded an oil-soluble, molybdenum-cobalt catalyst precursor having 13.1 wt % metal.

Example 4

Example 4 describes a method for making a molybdenum-cobalt catalyst precursor with a metal concentration of greater than 16.5 wt %. 10.0 g of molybdic acid (Aldrich, $MoO_3 \geqq 85.0\%$) and 25.5 g of 2-ethyl hexanoic acid (Aldrich, 99%) were mixed together in a 250 ml flask and then heated to 200° C. for 1 hour while stirring and purging with 100 ml/min of $N_2$. The mixture was then purged for another 8 hours with a mixture of 20% $H_2$ and 80% $N_2$ at the same temperature. The reaction yielded molybdenum 2-ethyl hexanoate containing 18.4 wt % Mo.

3.0 g of cobalt(II) hydroxide (Aldrich, $Co(OH)_2 > 95.0\%$) and 19.8 g of 2-ethyl hexanoic acid (Aldrich, 99%) were mixed together in a 250 ml flask and heated at 140° C. for 8 hours. The reaction yielded cobalt 2-ethyl hexanoate containing 8.7 wt % Co.

12.0 g of the molybdenum 2-ethyl hexanoate was mixed with 6.3 g of above cobalt 2-ethyl hexanoate to yield a molybdenum cobalt catalyst having 15.1 wt % metal.

Example 5

Example 5 describes a method for making a molybdenum-cobalt catalyst precursor with 70:30 ratio of molybdenum to cobalt. 30.0 g of molybdic acid (Aldrich, $MoO_3 \geqq 85.0\%$) and 102.2 g of 2-ethyl hexanoic acid (Aldrich, 99%) were mixed together in a 300 ml flask and then heated to 200° C. for 1 hour while stirring and purging with 100 ml/min of $N_2$. The purging was switched to a mixture of 20% $H_2$ and 80% $N_2$ and held for 12 hours at 200° C. The reaction yielded molybdenum 2-ethyl hexanoate with 14.6 wt % Mo.

3.0 g of cobalt(II) hydroxide (Aldrich, $Co(OH)_2 > 95.0\%$) and 19.8 g of 2-ethyl hexanoic acid (Aldrich, 99%) were mixed together in a 250 ml flask and then heated at 140° C. for 8 hours. The resulting cobalt 2-ethyl hexanoate contained 8.7 wt % Co.

9.08 g of the molybdenum 2-ethyl hexanoate was mixed with 6.55 g of the cobalt 2-ethyl hexanoate to yield a molybdenum-cobalt catalyst precursor with a 70:30 ratio of molybdenum to cobalt and 12.1 wt % metal.

Example 6

Example 6 describes a method for making a molybdenum-cobalt catalyst precursor with 95:5 ratio of molybdenum to cobalt. 10.0 g of molybdic acid (Aldrich, $MoO_3 \geqq 85.0\%$) and 25.5 g of 2-ethyl hexanoic acid (Aldrich, 99%) were mixed together in a 250 ml flask and then heated to 200° C. for 1 hour while stirring and purging with 100 ml/min of $N_2$ The mixture was then purged for another 8 hours with a mixture of 20% $H_2$ and 80% $N_2$ at the same temperature. The reaction yielded molybdenum 2-ethyl hexanoate containing 18.4 wt % Mo.

3.0 g of cobalt(II) hydroxide (Aldrich, $Co(OH)_2 > 95.0\%$) and 19.8 g of 2-ethyl hexanoic acid (Aldrich, 99%) were mixed together in a 250 ml flask and heated at 140° C. for 8 hours. The reaction yielded cobalt 2-ethyl hexanoate containing 8.7 wt % Co.

14.2 g of the as-prepared molybdenum 2-ethyl hexanoate was mixed with 1.59 g of the cobalt 2-ethyl hexanoate to yield an oil-soluble bimetallic catalyst precursor having molybdenum and cobalt in a ratio of 95:5 and 17.4 wt % metal.

Example 7

Example 7 describes a method for making a molybdenum-nickel catalyst precursor with 80:20 ratio of molybdenum to nickel. 10.0 g of molybdic acid (Aldrich, $MoO_3 \geqq 85.0\%$) and 25.5 g of 2-ethyl hexanoic acid (Aldrich, 99%) were mixed together in a 250 ml flask and then heated to 200° C. for 1 hour while stirring and purging with 100 ml/min of $N_2$. The mixture was then purged for another 8 hours with a mixture of 20% $H_2$ and 80% $N_2$ at the same temperature. The reaction yielded molybdenum 2-ethyl hexanoate containing 18.4 wt % Mo.

5.0 g of nickel(II) hydroxide (STREM, Ni %=61.6) and 15.3 g of 2-ethyl hexanoic acid (Aldrich, 99%) were mixed together in a 250 ml flask and heated to 140° C. for 6 hours. The reaction yielded nickel 2-ethyl hexanoate containing 16.8 wt % Ni.

11.93 g of the molybdenum 2-ethyl hexanoate was mixed with 3.27 g of the nickel 2-ethyl hexanoate to yield a molybdenum-nickel catalyst precursor having 18.1 wt % metal.

Example 8

Example 8 describes a method for making a molybdenum-manganese catalyst precursor with 80:20 ratio of molybdenum to managanes. 10.0 g of molybdic acid (Aldrich, $MoO_3 \geq 85.0\%$) and 25.5 g of 2-ethyl hexanoic acid (Aldrich, 99%) were mixed together in a 250 ml flask and then heated to 200° C. for 1 hour while stirring and purging with 100 ml/min of $N_2$ The mixture was then purged for another 8 hours with a mixture of 20% $H_2$ and 80% $N_2$ at the same temperature. The reaction yielded molybdenum 2-ethyl hexanoate containing 18.4 wt % Mo.

5.0 g of manganese (II) oxide (STREM, 99%) and 30.3 g of 2-ethyl hexanoic acid (Aldrich, 99%) were mixed together in a 250 ml flask heated at 140° C. for 8 hours. The reaction yielded manganese 2-ethyl hexanoate containing 11.5 wt % Mn.

11.93 g of the molybdenum 2-ethyl hexanoate was mixed with 4.77 g of the manganese 2-ethyl hexanoate to yield a molybdenum-manganese catalyst precursor containing 16.4 wt % metal.

Example 9

Example 9 describes a method for making a molybdenum-iron catalyst precursor with 80:20 ratio of molybdenum to iron. 10.0 g of molybdic acid (Aldrich, $MoO_3 \geq 85.0\%$) and 25.5 g of 2-ethyl hexanoic acid (Aldrich, 99%) were mixed together in a 250 ml flask and then heated to 200° C. for 1 hour while stirring and purging with 100 ml/min of $N_2$. The mixture was then purged for another 8 hours with a mixture of 20% $H_2$ and 80% $N_2$ at the same temperature. The reaction yielded molybdenum 2-ethyl hexanoate containing 18.4 wt % Mo.

5.0 g of iron (III) oxide (Hydrated, Aldrich, Fe wt %=62.85) and 24.4 g of 2-ethyl hexanoic acid (Aldrich, 99%) were mixed together in a 250 ml flask and heated at 140° C. for 6 hours. The reaction yielded iron 2-ethyl hexanoate containing 11.3 wt % Fe.

11.93 g of the molybdenum 2-ethyl hexanoate was mixed with 4.86 g of the iron 2-ethyl hexanoate to yield a molybdenum-iron catalyst precursor containing 16.3 wt % metal.

Example 10

Example 11 describes the use of the precursor of Example 1 to hydrocrack heavy oil. 21.8 grams of catalyst precursor was mixed with 278.9 grams of decant oil to make a mixture with a total weight of 300.0 g and then stirred until homogenous. The resulting precursor slurry had 9150 ppm metal. 2 grams of this catalyst precursor slurry was mixed with 181 g of heavy oil to form the final feedstock, which was fed into Reactor A under the following reaction conditions: reaction temperature of 824.6° F., reaction pressure of 2200 psig, and a weight ratio of $H_2$ to feed oil of 19 g/181 g. The results of the hydrocracking process are shown below in Table 1.

Example 11

Example 11 describes the use of the precursor of Example 2 to hydrocrack heavy oil. 48.8 grams of catalyst precursor was mixed with 281.3 grams of decant oil to make a mixture with a total weight of 300.0 g and then stirred until homogenous. The resulting precursor slurry had 9150 ppm metal. 2 grams of this catalyst precursor slurry was mixed with 181 g of heavy oil to form the final feedstock, which was fed into Reactor B under the following reaction conditions: reaction temperature of 824.56° F., reaction pressure of 2200 psig, and a weight ratio of $H_2$ to feed oil of 19 g/181 g. The results of the hydrocracking process are shown below in Table 1.

Example 12

Example 12 describes the use of the catalyst precursors of Examples 3-9 to hydrocrack heavy oil. In independent reactions, an amount of catalyst precursor formed in respective Examples 3-9 is mixed with decant oil to form a mixture with a total weight of 300.0 grams and 9150 ppm metal. The respective diluted mixtures are stirred to form a homogenous precursor slurry. 2 grams of this catalyst precursor slurry is mixed with 181 g of heavy oil to form the final feedstock, which is fed into a reactor under the following reaction conditions: reaction temperature of 825° F., reaction pressure of 2200 psig, and a weight ratio of $H_2$ to feed oil of 19 g/181 g.

Example 13 (Comparative)

Example 13 describes the use of a comparison molybdenum catalyst precursor in a hydrocracking process. 18.3 g of a comparison molybdenum 2-ethyl hexanoate complex containing 15% molybdenum was mixed with 281.7 g of decant oil to produce a catalyst slurry with 9150 ppm of catalyst. 2 g of this catalyst slurry was mixed with 181 g of heavy oil to form the final feed. Catalyst precursor prepared according to Example 13 was used as a comparison in both Reactor A and Reactor B. The results of the hydrocracking process are shown in Table 1.

TABLE A

| | Reaction results | | | |
|---|---|---|---|---|
| Catalyst Sample | Example 10 | Example 11 | Example 13 (Reactor A) | Example 13 (Reactor B) |
| Process conversion (w %) | 83.0 | 80.8 | 81.3 | 80.5 |
| Process HI conversion (w %) | 83.5 | 78.9 | 76.6 | 76.9 |
| Process asphaltene conversion (w %) | 86.0 | 81.4 | 79.4 | 79.4 |
| $C_1$-$C_3$ gas yield (w %) | 6.73 | 5.91 | 4.91 | 4.91 |
| Bottoms IBP-375° F. sediment (w %) | 1.18 | 1.32 | 1.26 | 1.26 |

As shown in the results from the hydrocracking process, the bimetallic catalyst precursors of the present invention show reduced sediment and improved asphaltenes conversion. Consequently, hydrocracking performed using the catalyst precursors of the present invention are less likely to coke up or become fouled as compared to hydrocracking performed with existing catalyst precursors.

Examples 14-16 (Comparative)

Examples 14-16 compare the use of three different catalyst precursors compared to a conventional molybdenum 2-ethyl hexanoate complex containing 15% molybdenum in a pilot hydrocracking process. The catalyst precursors studied were designated Catalyst Nano #1, Catalyst Nano #2, and Catalyst Nano #3 and contained the following ratios of metal:
Catalyst Nano #1: 80% Mo+20% Ni
Catalyst Nano #2: 80% Mo+10% Ni+10% Fe
Catalyst Nano #3: 50% Mo+30% Ni+20% Fe Catalyst Nano #1 was manufactured substantially according to Example 7 above. Catalyst Nano #2 and #3 were manufactured by modifying Examples 7 and 9 above by varying the quantities of metals to yield the ratios listed herein.

The bench tests in these examples were conducted with a single reactor having a nominal 2700 cc internal volume (including recycle loop), and autoclave runs were made using a 1-liter autoclave. The main purpose of bench test was to determine the relative performance between the three inventive catalyst precursors and the conventional molybdenum 2-ethyl hexanoate catalyst precursor. Material recoveries were excellent during the bench test program. The average material recovery for the entire bench test was 99.2 wt %. During the test, residue conversion ranged from 66 to 70 wt %. Similarly, asphaltene conversion ranged from 49 to 64 W %. The sediments ranged from 0.19 to 0.65 wt %. The average material recovery for the entire autoclave test was 98.9 wt %.

The feedstock that was used to conduct the comparative test was a commercial vacuum residuum having an API gravity of 5.1 and 91.62 wt % of constituents having a boiling point above 975° F. A summary of the running process yields and performance is provided in Table 1.

| Catalyst Precursory | Mo 2-ethyl hexanoate | NANO #1 | NANO #2 | NANO #3 |
|---|---|---|---|---|
| Resid Conversion (ash free) VB | 68.4 | 67.4 | 69.1 | 67.1 |
| Asphaltene Conversion (HI-TI) VB | 57.0 | 55.8 | 60.3 | 51.3 |
| Resid Conversion (ash free) P2 | 69.8 | 68.7 | 70.7 | 67.9 |
| Asphaltene Conversion (HI-TI) P2 | 59.7 | 64.0 | 64.8 | 62.9 |
| CCR Conversion (ash free) VB | 48.9 | 47.7 | 49.5 | 45.4 |
| O-6 Bottoms IP-375 Sediment, wt % O-6 Bottoms (ash free) | 0.34 | 0.34 | 0.19 | 0.58 |
| $C_1$-$C_3$ Yld, wt % maf fresh feed | 5.2 | 5.2 | 5.5 | 5.1 |
| $C_4$-$C_7$ Yld, wt % maf fresh feed | 2.8 | 2.8 | 2.8 | 2.7 |
| Distillate Yld (IBP-524° C.), wt % maf fresh feed | 61.5 | 60.7 | 61.9 | 60.9 |
| Resid Yld (524° C.+), wt % maf fresh feed | 28.6 | 29.4 | 27.9 | 29.8 |
| Hydrogen Consumption (245-88) (400K—400K)/psig | 1063 | 1129 | 1103 | 1094 |

The foregoing data indicates that Nano #2 outperformed the commercial catalyst precursor in almost every category. Nano #1 was as good as the commercial catalyst precursor (within experimental error) but utilized 20% less molybdenum at a significant cost saving. Nano #3 performed slightly below the commercial catalyst precursor but did so with only 50% of the molybdenum content, at a considerable cost saving.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for making a bimetallic catalyst precursor for hydroprocessing heavy oil, comprising:
   (i) providing a plurality of molybdenum atoms and a plurality of secondary transition metal atoms, wherein the secondary transition metal atoms comprise one or more transition metals other than molybdenum, wherein at least a portion of the secondary transition metal atoms form precipitated metal if heated together with an organic agent at or above a precipitation temperature for the secondary transition metal atoms;
   (ii) providing an organic agent comprising a plurality of organic molecules, each organic molecule having at least one functional group that is reactive to the molybdenum atoms and the secondary transition metal atoms;
   (iii) reacting the molybdenum atoms with a portion of the organic agent at a temperature range from about 100° C. to about 300° C. to yield a hydrocarbon-soluble molybdenum salt; and
   (iv) mixing the secondary transition metal atoms with the molybdenum salt and reacting the secondary transition metal atoms with a second portion of the organic agent to yield a hydrocarbon-soluble secondary transition metal salt mixed with the molybdenum salt and thereby form the bimetallic catalyst precursor, wherein the reaction temperature during step (iv) is less than the reaction temperature during step (iii) and also less than the precipitation temperature for the secondary transition metal atoms so that the secondary transition metal atoms preferentially react with the organic agent to form the hydrocarbon-soluble secondary transition metal salt rather than precipitated metal.

2. A method as in claim 1, the bimetallic catalyst precursor comprising:
   a molybdenum salt comprising a plurality of molybdenum atoms, each bonded to a plurality of organic anions; and
   a secondary transition metal salt comprising a plurality of transition metal atoms other than molybdenum, each metal atom being bonded to a plurality of organic anions, wherein the weight ratio of the molybdenum atoms to the secondary transition metal atoms is between about 98:1 and about 1:10.

3. A method as in claim 1, wherein the weight ratio of the molybdenum atoms to the secondary transition metal atoms is between about 95:1 and about 1:5.

4. A method as in claim 2, wherein the weight ratio of the molybdenum atoms to the secondary transition metal atoms is between about 10:1 and about 1:1.

5. A method as in claim 2, wherein the weight ratio of the molybdenum atoms to the secondary transition metal atoms is between about 8:1 and about 2:1.

6. A method as in claim 2, wherein the secondary transition metal atoms comprise at least one of cobalt, nickel, iron, or manganese.

7. A method as in claim 2, wherein the organic anions comprise carboxylate anions having 2 to 14 carbon atoms.

8. A method as in claim 7, wherein the carboxylate anions are selected from the group consisting of butanoic acid, pentanoic acid, hexanoic acid, heptanoic acid, octanoic acid, decanoic acid, 2-ethyl butanoic acid, 2-methyl pentanoic acid, 2-ethyl hexanoic acid, and combinations thereof.

9. A method as in claim 2, further comprising forming a diluted bimetallic catalyst precursor by mixing the bimetallic catalyst precursor with a diluent.

10. A method as in claim 1, wherein the secondary transition metal atoms comprise at least one of cobalt, nickel, iron, or manganese.

11. A method as in claim 1, wherein the organic anions comprise carboxylate anions having 2 to 14 carbon atoms.

12. A method as in claim 1, wherein the carboxylate anions are selected from the group consisting of butanoic acid, pentanoic acid, hexanoic acid, heptanoic acid, octanoic acid, decanoic acid, 2-ethyl butanoic acid, 2-methyl pentanoic acid, 2-ethyl hexanoic acid, and combinations thereof.

13. A method as in claim 1, wherein the molybdenum atoms are provided as molybdic acid.

14. A method as in claim 1, wherein the reaction temperature during step (iv) is at least 5° C. less than the reaction temperature during step (iii).

15. A method as in claim 1, wherein the reaction temperature during step (iv) is at least 10° C. less than the reaction temperature during step (iii).

16. A method as in claim 1, wherein the reaction temperature during step (iv) is at least 25° C. less than the reaction temperature during step (iii).

17. A method as in claim 1, wherein the reaction of the molybdenum atoms with the organic agent and/or the reaction of the secondary transition metal atoms with the organic agent is carried out in the presence of a reducing agent.

18. A method as in claim 17, wherein the reducing agent is hydrogen gas.

19. A method as in claim 1, further comprising dispersing the bimetallic catalyst precursor throughout a heavy oil feedstock to yield a conditioned feedstock composition.

20. A method for making a bimetallic catalyst precursor for hydroprocessing heavy oil, comprising:
providing a plurality of molybdenum atoms and a plurality of secondary transition metal atoms, wherein the secondary transition metal atoms comprise one or more transition metals other than molybdenum, wherein at least a portion of the secondary transition metal atoms form precipitated metal if heated together with an organic agent at or above a precipitation temperature for the secondary transition metal atoms;
providing an organic agent comprising a plurality of organic molecules having between 2 and 14 carbon atoms and at least one functional group that is reactive to the molybdenum atoms and the secondary transition metal atoms;
reacting the molybdenum atoms with a portion of the organic agent at a temperature range from about 100° C. to about 300° C. to yield a hydrocarbon-soluble molybdenum salt;
in a separate reaction, reacting the secondary transition metal atoms with a second portion of the organic agent at a temperature that is less that the molybdenum reaction temperature and that is less than the precipitation temperature for the secondary transition metal atoms so that the secondary transition metal atoms react with the organic agent to preferentially yield a hydrocarbon-soluble secondary transition metal salt rather than precipitated metal; and
mixing the hydrocarbon-soluble secondary transition metal salt with the hydrocarbon-soluble molybdenum salt to yield the bimetallic catalyst precursor.

21. A method as in claim 20, wherein the secondary transition metal atoms comprise at least one of cobalt, nickel, iron, or manganese.

22. A method as in claim 20, wherein the molybdenum salt is mixed with the secondary transition metal salt at a temperature below about 100° C.

23. A method as in claim 20, wherein the organic molecules comprise a carboxylic acid functional group.

24. A method as in claim 20, wherein the organic molecules are selected from the group consisting of butanoic acid, pentanoic acid, hexanoic acid, heptanoic acid, octanoic acid, decanoic acid, 2-ethyl butanoic acid, 2-methyl pentanoic acid, 2-ethyl hexanoic acid, and combinations thereof.

25. A method as in claim 20, wherein the molybdenum atoms are provided as molybdic acid.

26. A method as in claim 20, wherein the reaction of the molybdenum atoms with the organic agent and/or the reaction of the secondary transition metal atoms with the organic agent is carried out in the presence of a reducing agent.

27. A method as in claim 26, wherein the reducing agent is hydrogen gas.

28. A method as in claim 20, further comprising dispersing the bimetallic catalyst precursor throughout a heavy oil feedstock to yield a conditioned feedstock composition.

* * * * *

UNITED STATES PATENT AND TRADEMARK OFFICE
CERTIFICATE OF CORRECTION

PATENT NO. : 7,842,635 B2
APPLICATION NO. : 11/461652
DATED : November 30, 2010
INVENTOR(S) : Zhou et al.

Page 1 of 2

It is certified that error appears in the above-identified patent and that said Letters Patent is hereby corrected as shown below:

Column 5
Line 67, change "acid" to --acids--

Column 7
Line 64, change "precursor" to --precursors--

Column 10
Line 3, before "temperature" insert --a--

Column 13
Line 17, remove [of]
Line 28, change "MoO3" to --MoO$_3$--
Line 52, remove [of]

Column 14
Line 15, remove [above]
Line 46, change "N$_2$ The" to --N$_2$. The--

Column 15
Line 18, change "managanes" to --manganese--
Line 22, change "N$_2$ The" to --N$_2$. The--

Column 17
Line 23, change "of bench test" to --of the bench test--

Column 19
Line 4, claim 3, change "claim 1" to --claim 2--

Signed and Sealed this
Twenty-first Day of August, 2012

David J. Kappos
*Director of the United States Patent and Trademark Office*

Column 20
Line 22, Claim 20, change the second instance of "that" to --than--